United States Patent [19]
Guidry

[11] Patent Number: 5,142,814
[45] Date of Patent: Sep. 1, 1992

[54] CRUSTACEAN TRAP

[76] Inventor: Dean P. Guidry, Rte. 3 Box 3859, St. Martinville, La. 70582

[21] Appl. No.: 549,367

[22] Filed: Jul. 6, 1990

[51] Int. Cl.⁵ .................................................. A01K 69/10
[52] U.S. Cl. .................................................... 43/105
[58] Field of Search ................. 43/100, 102, 103, 104, 43/105

[56] References Cited

U.S. PATENT DOCUMENTS

| | | | |
|---|---|---|---|
| 980,148 | 12/1910 | Garrard | 43/105 |
| 1,887,059 | 11/1932 | Kraus | 43/105 |
| 3,209,484 | 10/1965 | Beamer | 43/100 |
| 3,708,905 | 1/1973 | Jalbert | 43/100 |
| 3,906,655 | 9/1975 | Lowenthal | 43/105 |
| 3,939,597 | 2/1976 | McSherry | 43/105 |
| 3,950,885 | 4/1976 | Simeti | 43/105 |

*Primary Examiner*—Kurt Rowan
*Attorney, Agent, or Firm*—Pravel, Gambrell, Hewitt, Kimball & Krieger

[57] ABSTRACT

A collapsible crayfish trap apparatus of non-metallic material disassembles to a collapsed, substantially flat position for storage and transportation. Upon assembly, the trap apparatus has side walls with specially positioned scores or hinges that define inlets upon assembly.

13 Claims, 4 Drawing Sheets

CRUSTACEAN TRAP

BACKGROUND OF THE INVENTION

1. Field of the Invention

The present invention relates to an improved preferably non-metallic crayfish trap that can be folded substantially flat for storage and/or transport wherein plastic wall panels have scores or hinges that allow funnels or inlet cones to be instantly formed upon assembly to define inlets for crayfish, the upper ends of the walls defining an outlet for emptying the trap of its harvested contents.

2. General Background

Crayfish traps have traditionally been constructed of a wire material such as a woven wire mesh material. This wire mesh is often coated with a plastic such as polyvinyl chloride (PVC).

The flexing of the wire can cause cracking of the plastic over time, allowing water to contact the metal wire. Water begins to create a rust problem that can render the trap useless, as holes develop in the trap through which the crayfish can escape.

Wire traps are very labor intensive. The wire must be manufactured, cut, formed to a desired shape and then sealed along seams all usually by hand labor. A degree of skill is also required to assemble wire traps properly because of size and shape requirements. If the trap is poorly constructed, inlet openings can be too small so that crayfish can't enter, or too large so that they easily escape.

Another problem with wire traps is an inability to retain their shape after repeated use. These traps typically need to sit flat against a water bottom. Repeated raising/lowering of the traps causes them to gradually deform, so that they do not register upon the bottom. Their inlets can deform over time permitting escape of the trapped creatures.

Metal fatigue is a problem that has long plagued the wire traps. After repeated handling, they tend to crack and fail.

Storage and transportation of traps presents a tremendous problem. Traps are used by commercial crayfish farmers in the tens of thousands in many cases. These traps must be transported to and from the farm at least twice and sometimes four times during a year. A small boat can usually carry about twenty five to fifty traps. The boats must be small because crayfish farms are a shallow water environment, usually having less than two feet of water depth. Thus hundreds of trips are required by boat to place the thousands of traps that are usually deployed. Wire traps are permanently erected structures that cannot be collapsed for saving space in storage and transport.

Thus, it is an object of the present invention to provide an improved crayfish trap that can be collapsed for storage, preferably to a fully flattened position.

It is another object of the invention to provide an improved crayfish trap of entirely nonmetallic construction.

Another object of the present invention is to provide an improved crayfish trap having a configuration that affords resistance to deformation even after repeated uses.

Yet another object of the present invention is to provide a crayfish trap apparatus that instantly defines both inlet openings for catching crayfish, and an outlet opening for emptying the trap upon assembly of the trap.

SUMMARY OF THE PRESENT INVENTION

The present invention solves the prior art problems and short comings in a simple straight forward yet efficient manner by providing a collapsible crayfish trap apparatus that includes a trap body of plastic mesh material having multiple outer side walls, each including at least an upper smaller wall portion and a lower larger wall portion, and at least one of the walls having intersection border portions of strip materials surrounding an area of an array of perforations or openings. A plurality of elongated hinges traverse one or more of the border portions, each defining folds that allow the body to be collapsed or erected by bending one or more of the walls at the hinges. The body includes one or more inlet portions for allowing the entry of a crayfish into the trap interior at least when the trap is erected. A trap floor connects to the side wall portions at one of the hinges and an enlarged opening in the trap body, much larger than the inlet is provided for emptying crayfish from the trap.

In the preferred embodiment, the enlarged opening communicates with the upper wall portions in the preferred embodiment, the trap body has at least three wall portions.

In the preferred embodiment, each wall portion is inclined during use.

In the preferred embodiment, the trap body is entirely of a plastic material, preferably polypropylene or polyethylene material.

In the preferred embodiment, each wall portion of the trap body has a segment that defines a portion of the floor.

In the preferred embodiment, each wall portion has a funnel inlet segment portion that folds inwardly upon assembly.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
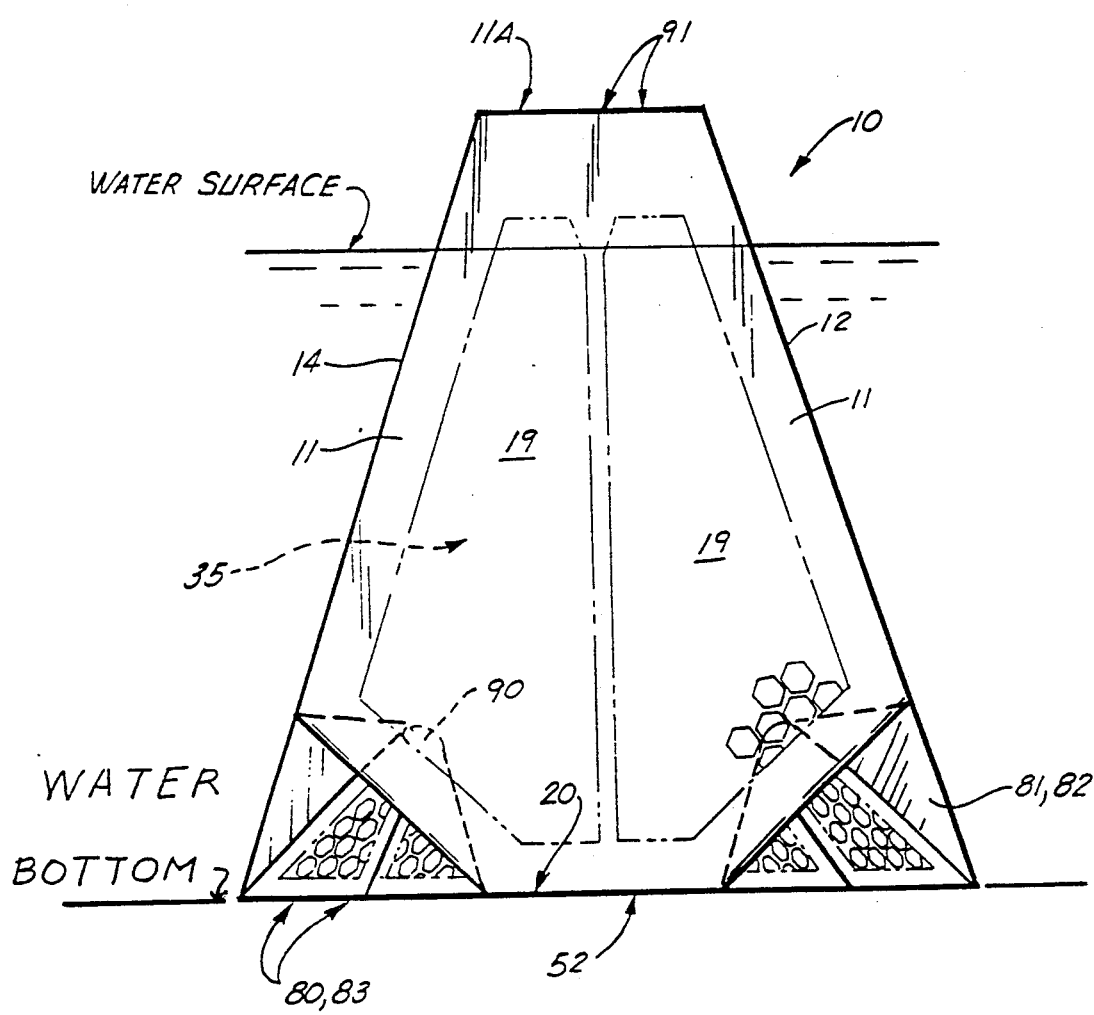
FIG. 1 is a elevational view of the preferred embodiment of the apparatus of the present invention.

The trap apparatus 10 of the present invention includes three or four sidewalls. In FIG. 1, four sidewalls 11-14 are shown, each terminating at respective upper edges 15-18, so that upon assembly or erection, edges 15-18 define a rectangular opening for emptying crayfish trapped within the trap 10 interior 19.

Each sidewall 11-14 has a plurality of scores or hinges that divide each respective sidewall 11-14 into smaller wall panels or wall segments. Some wall panels define an inlet portion upon assembly. Other wall panels define a portion of the trap floor 20. The largest wall panel defines an upwardly extending sidewall. Each sidewall 11-14 is of substantially identical construction, with the sidewalls 11-14 being connected along edge portions thereof using sonic welding.

Figure 2:
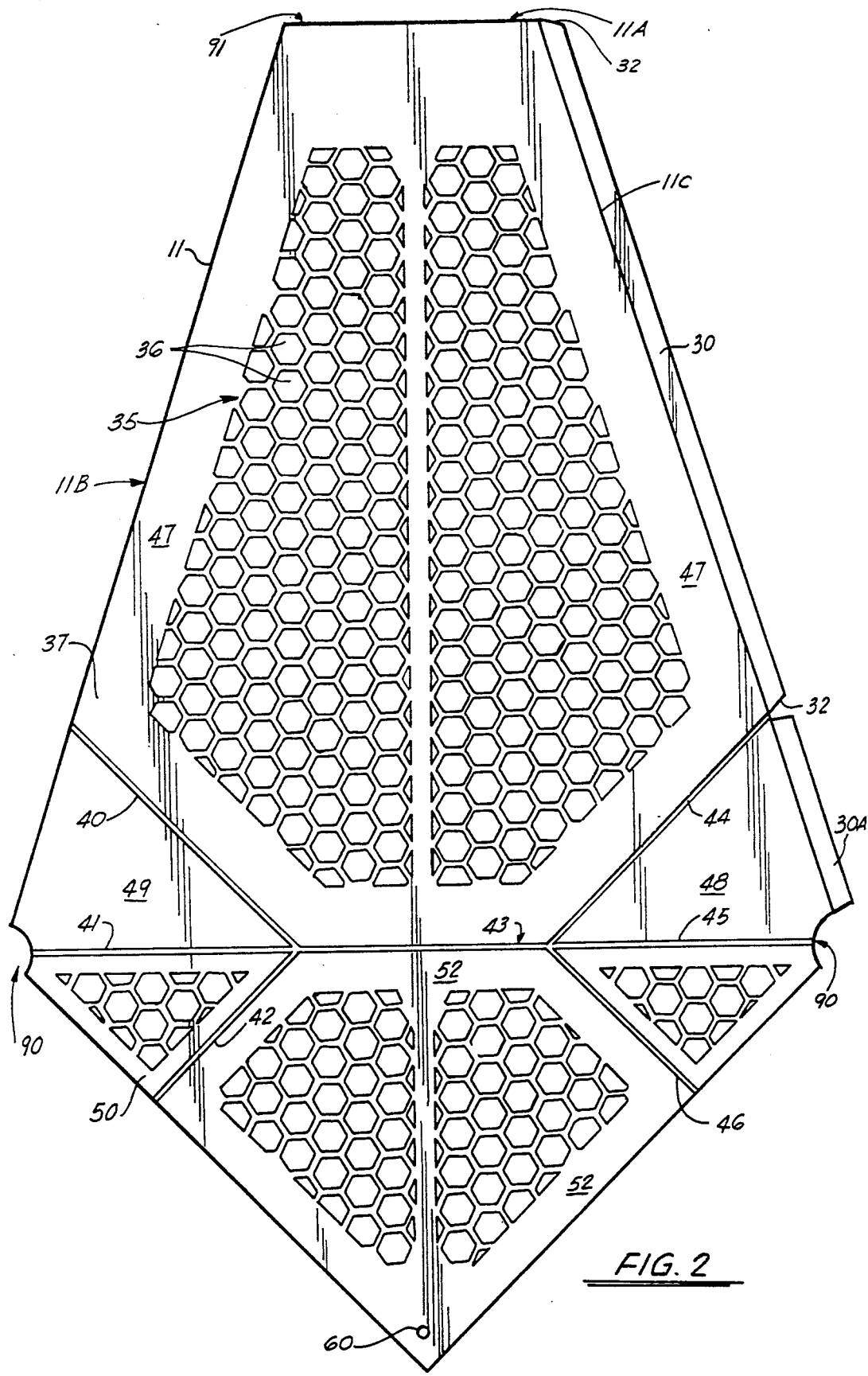
FIG. 2 is a plan view of a single side wall portion of the preferred embodiment of the apparatus of the present invention.

As each sidewall 11-14 is of identical construction and shape, a detailed discussion of the structure of wall 11 follows hereinafter. The other walls 12-14 are identical in construction and function to wall 11 as described hereinafter. FIG. 2 shows a single side wall 11 having an upper edge 11A a first side edge 11B, and a second side edge 11C which carries rectangular assembly flange 30 having end portions 31, 32. Flange 30 is provided for assembling side wall 11 to the next adjacent side wall 12 and more particularly to the first side edge 12B thereof by means of sonic welding for example. In similar fashion, each side wall 12, 13, 14 provides an assembly flange 30 which is sonic welded to the first side edge 11B, 13B, 14B of each side wall 11-14. Side wall 11 carries a central perforated section 35 which has an array of openings 36, spaced in a uniform pattern as shown in FIG. 2. The array 35 of openings 36 is surrounded by a peripheral border 37, the border being defined at its edges by upper wall edge 11A, and side edges 11B, 11C, and hinge 43. A plurality of scores or hinges 40-46 divide side wall 11 into a plurality of panels or segments. The segment 47 is the largest segment of side wall 11 and carries border 37 as well as the array 35 of openings 36. Panels 48, 49 and 50, 51 fold inwardly with respect to the interior of trap 10 and define openings which allow crayfish to enter the trap. It should be understood that the use of funnel shaped entry openings is known with respect to wire mesh crayfish traps in general.

The panel 52 folds inwardly and underneath the panel 47 and defines a quarter (¼) of the bottom of trap 10 in the embodiment of FIGS. 1 and 2 wherein four side walls 11-14 are provided. Each segment 52 provides a rivet or stud 60 that attaches to closure disk 70 at an opening 72 upon assembly. Disk 70 has one opening for each side wall 11-14 and thus for each rivet 60. Each opening 72 provides an enlarged portion 73 and a narrowed portion 74 which engages the rivet 60. The rivet 60 would have an enlarged head portion so that upon assembly the disk could not easily be removed from the plurality of rivets 60. Handle 75 facilitates manual rotation of the disk.

In order to assemble the trap 10, a user simply orients the four side walls 11-14 into a generally squared or rectangular box-like shape. The user then forms the inlet portions, designated generally by the numerals 80-83 in FIG. 1 by pressing upon the scores 41 and 45 of each side wall forcing the panels 48, 49, 50 and 51 inwardly. Cut-outs 90 align to define a generally circular entry opening upon assembly through which crayfish will enter the trap in order to get to a bait product contained within. The bait product is commercially available and is typically a beef or fish product.

Figure 3:
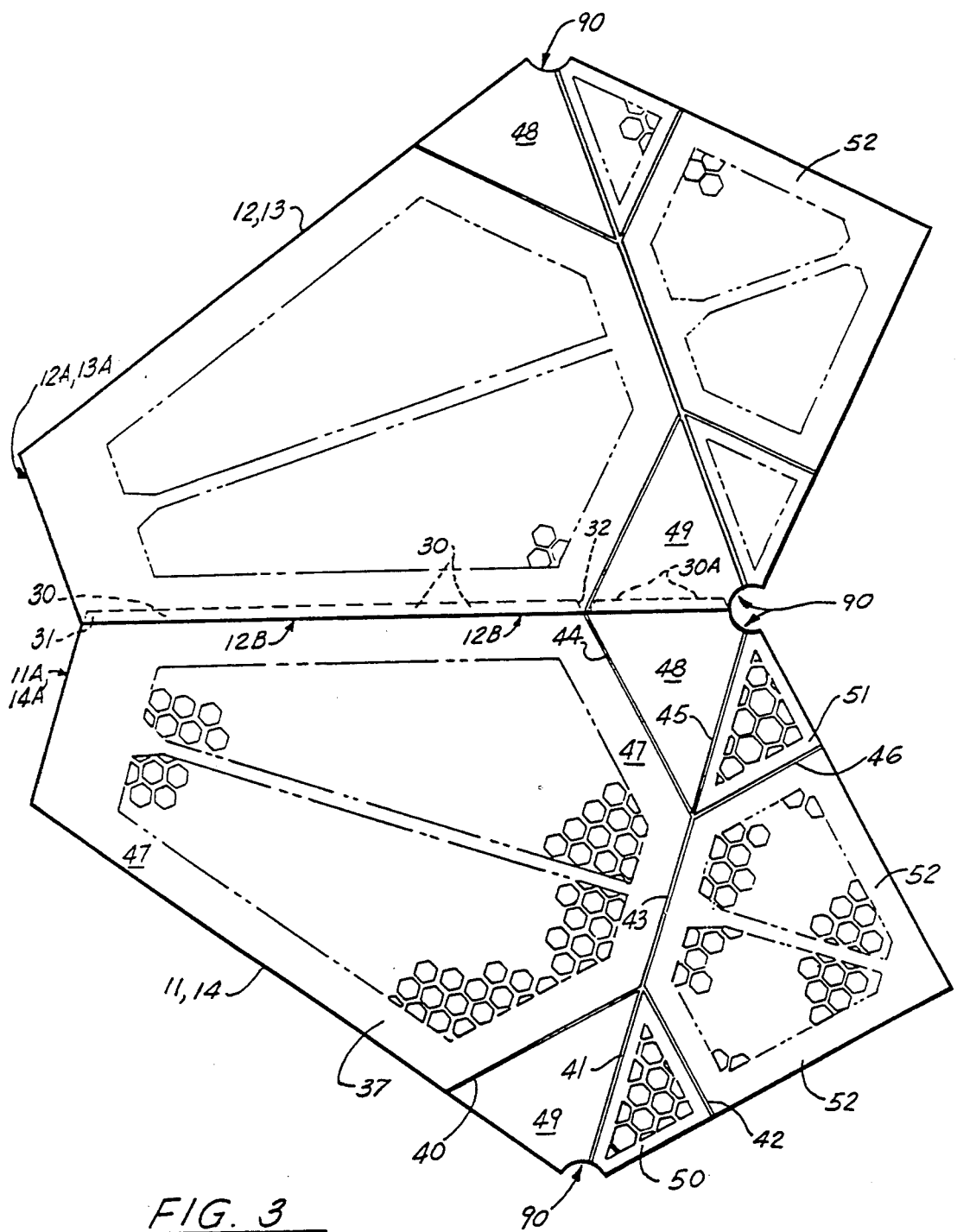
FIG. 3 is a plan view of the preferred embodiment of the apparatus of the present invention shown in a collapsed condition.
Figure 5:
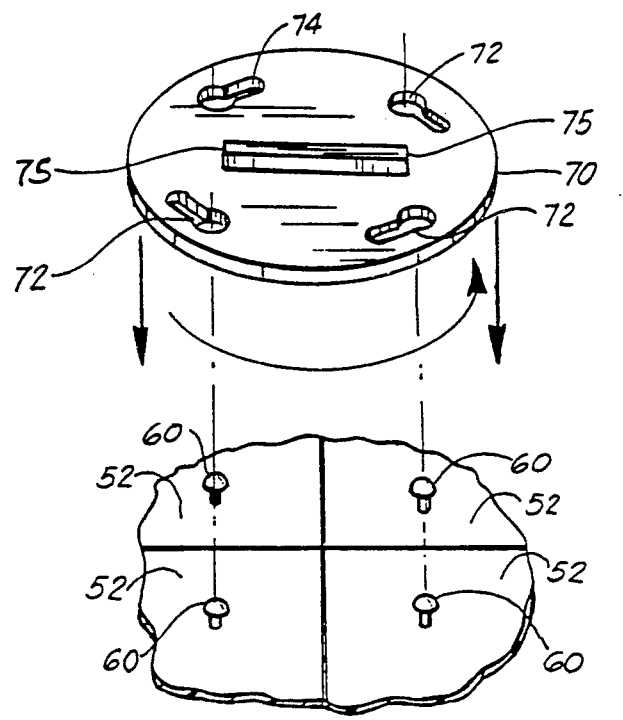
FIG. 5 is a detailed view of the closure member for the bottom portion of the preferred embodiment of the apparatus of the present invention.
Figure 4:
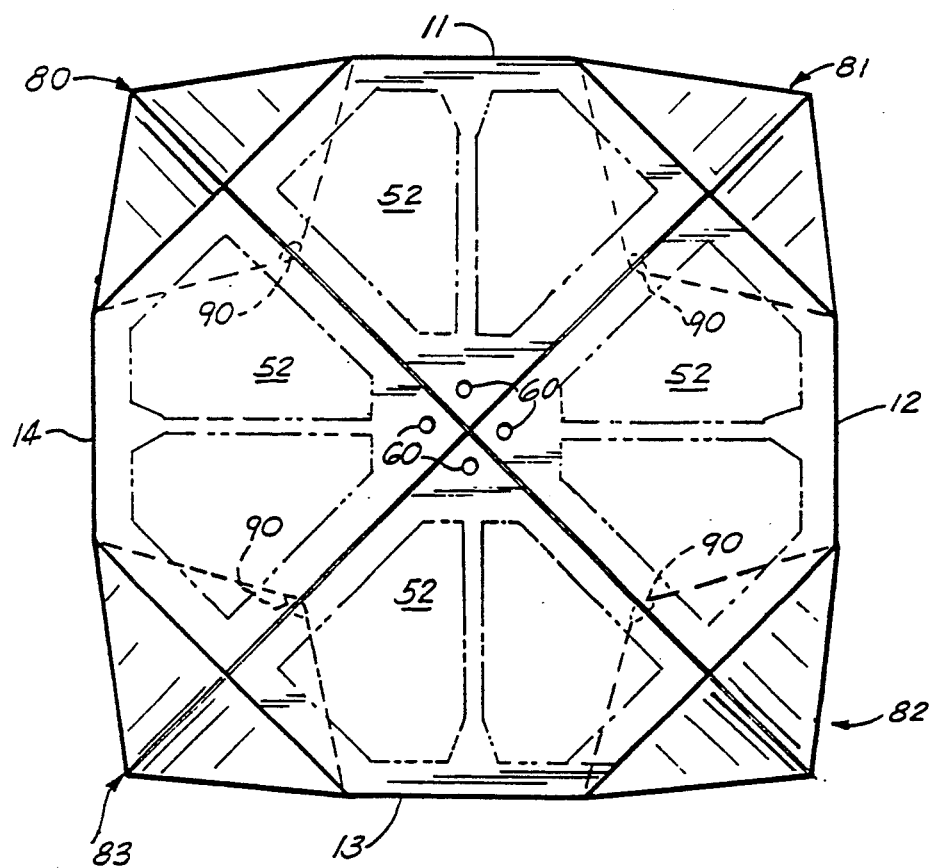
FIG. 4 is a bottom view of the preferred embodiment of the apparatus of the present invention.

As the user presses the panels 48, 49, 50 and 51 inwardly, the bottom 52 panel is folded inwardly as well so that the panels 52 abut upon assembly to define a flat planar bottom as shown in the bottom view of FIG. 3. Thus, the bottom is substantially flat upon assembly so that it sits flat against a water bottom such as a muddy bottom of a swamp, marsh, commercial pond or the like.

An open top 91 is defined by the plurality of upper edges 11a-14A of side walls 11-14. The outlet 91 is substantially larger than the inlet opening formed by cutouts 90 through which crayfish enter the trap In this manner, when the trap is inverted, large numbers of crayfish can be emptied very quickly into a container such as an ice chest, basket, sack, or the like. However, the cutouts 90 are small enough so that a crayfish can enter the trap, but has difficulty exiting the trap. The inlet openings formed by cutouts 90 are thus on the order of one to two inches (1"-2") in overall width or diameter. The panels 48, 49 could be made of solid rather than perforated plastic to prevent crayfish from gaining traction thereon to discourage escape from the trap. The panel 48 can carry a flange 30A for sonic welding to the panel 49 upon assembly.

The trap 10 of the present invention could be manufactured of any suitable plastic material such as polyethylene or polypropylene.

The trap can be fully collapsed to an almost flat position by orienting each side wall 11, 14 in its expanded, plainer orientation as shown in FIG. 2 and then folding two side walls 11-12 upon the other side walls 13, 14.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A collapsible crayfish trap apparatus, comprising:
    a) a trap body of plastic mesh material having at least three outer side walls each including at least an upper smaller wall portion and a lower larger wall, at least one of the walls having intersecting border portions of strip material surrounding an area with an array of openings;
    b) a plurality of elongated hinges that traverse one or more of the border portions each defining folds that allow the trap body to be collapsed or erected by bending one or more of the walls at the hinges;
    c) the trap body having one or more inlets for allowing the entry of crayfish into the trap interior at least when the trap is erected;
    d) a trap floor that connects to the side wall portions and each side wall has a segment that defines a portion of the trap floor, and;
    e) an enlarged opening in the trap body, substantially larger than each of the inlets, for emptying crayfish from the trap.

2. The apparatus of claim 1 wherein the enlarged opening communicated with the upper wall portion.

3. The apparatus of claim 1 wherein the trap body has at least three wall portions.

4. The apparatus of claim 1 wherein each wall portion is inclined during use.

5. The apparatus of claim 1 wherein the trap body is of a polypropylene material.

6. The apparatus of claim 1 wherein the trap body is of a polyethylene material.

7. The apparatus of claim 3 wherein each wall portion has a funnel inlet segment portion that folds inwardly upon assembly.

8. A collapsible crustacean trap apparatus, comprising:

a) a trap body of plastic mesh material having multiple outer side walls with arrays of openings in the walls and each wall has a funnel inlet segment portion that can instantly fold inwardly upon assembly, the funnel inlet separated from the walls with a hinge;

b) a plurality of elongated hinges in the form of reduced thickness portions of the wall that traverse one or more of the walls, each defining folds that allow the trap body to be collapsed or erected by bending at the hinges;

c) the trap body having one or more inlets for allowing the entry of crustaceans into the trap interior at least when the trap is erected;

d) a trap floor that connects to the side walls;

e) an enlarged opening in the trap body, larger than the inlet, for emptying crustaceans from the trap; and f) means comprising in part the scores for defining the inlet openings and outlet instantly upon erection of the trap.

9. The apparatus of claim 8 wherein the trap body is of a polypropylene material.

10. The apparatus of claim 8 wherein the trap body is of a polyethylene material.

11. The apparatus of claim 8 wherein each wall portion has a segment that defines a portion of the trap floor, and a hinge separates the floor from the remainder of each associated side wall.

12. The apparatus of claim 8 wherein at least two angularly oriented hinges are formed in each sidewall.

13. The apparatus of claim 12 wherein at least three angularly oriented hinges are formed in each side.

* * * * *